(12) United States Patent
Thodupunoori et al.

(10) Patent No.: US 10,142,322 B2
(45) Date of Patent: Nov. 27, 2018

(54) METHODS AND APPARATUS FOR AUTHENTICATING IDENTITY OF WEB ACCESS FROM A NETWORK ELEMENT

(71) Applicant: Tellabs Operations Inc., Naperville, IL (US)

(72) Inventors: Santhosh Kumar Thodupunoori, San Jose, CA (US); Senthil Raja Velu, Sunnyvale, CA (US); Sridharan Muthuswamy, Cupertino, CA (US)

(73) Assignee: TELLABS, INC., Naperville, IL (US)

( * ) Notice: Subject to any disclaimer, the term of this patent is extended or adjusted under 35 U.S.C. 154(b) by 1095 days.

(21) Appl. No.: 14/143,853

(22) Filed: Dec. 30, 2013

(65) Prior Publication Data

US 2014/0115678 A1    Apr. 24, 2014

Related U.S. Application Data

(62) Division of application No. 13/231,610, filed on Sep. 13, 2011.

(51) Int. Cl.
| | |
|---|---|
| *G06Q 30/00* | (2012.01) |
| *H04L 29/06* | (2006.01) |
| *G06Q 30/02* | (2012.01) |
| *H04L 29/08* | (2006.01) |

(52) U.S. Cl.
CPC ..... *H04L 63/0823* (2013.01); *G06Q 30/0248* (2013.01); *H04L 63/126* (2013.01); *H04L 67/02* (2013.01); *H04L 67/20* (2013.01)

(58) Field of Classification Search
None
See application file for complete search history.

(56) References Cited

U.S. PATENT DOCUMENTS

| | | | | |
|---|---|---|---|---|
| 8,700,003 | B2 * | 4/2014 | Klein | G07C 13/00 455/411 |
| 2008/0229098 | A1 * | 9/2008 | Ishak | G06F 21/31 713/156 |
| 2009/0125376 | A1 * | 5/2009 | Sundaresan | G06Q 30/02 705/7.33 |
| 2010/0005156 | A1 * | 1/2010 | Wesby | H04L 67/04 709/219 |

* cited by examiner

*Primary Examiner* — John W Hayes
*Assistant Examiner* — John Winter
(74) *Attorney, Agent, or Firm* — James M. Wu; JW Law Group

(57) ABSTRACT

A network configuration having various network elements and user equipments configured to authenticate web access requests is disclosed. Upon receipt of web addresses from various subscribers, the web addresses such as online advertisements are stored in a memory. The network traffic in the communication network is monitored in accordance with the web addresses stored in the memory. After detecting a website assess request such as a click of an online advertisement, an authentication record which authenticates the origin of the network equipment issuing the request. The authentication record is forwarded to a subscription partner via a predefined messaging mechanism.

19 Claims, 5 Drawing Sheets

METHODS AND APPARATUS FOR AUTHENTICATING IDENTITY OF WEB ACCESS FROM A NETWORK ELEMENT

PRIORITY

This application is a divisional application of U.S. patent application Ser. No. 13/231,610, filed on Sep. 13, 2011 in the name of the same inventor and entitled "Methods and Apparatus for Authenticating Identity of Web Access From a Network Element," hereby incorporated into the present application by reference.

FIELD

The exemplary embodiment(s) of the present invention relates to communications network. More specifically, the exemplary embodiment(s) of the present invention relates to providing reliable authenticity of a user's equipment during a network transaction.

BACKGROUND

With rapid growth of mobile data transfer over a high-speed communication network such as 3G or 4G cellular services, managing and controlling such data transfer become increasingly difficult and complicated. Transferring massive amount of data between various portable devices such as smart phones and laptops over a typical or standard network becomes increasingly challenging. A conventional network layout includes Internet, LAN (local area network), and wireless networks that includes hundreds of network devices such as access switches, routers, and bridges for facilitating data delivery from source devices to destination devices.

With increasing popularity of portable devices, online advertisements over various applications as well as mobile applications become prevalent and widely practiced. To support and control voluminous online advertisements over various applications, managing online advertisements becomes an important network task. For example, an advertiser typically compensates a publisher based on a scheme of cost per click ("CPC"). For instance, the advertiser compensates or pays 10 cent to a publisher every time a user clicks on a posted advertisement. The CPC scheme, however, also induces or invites fraudulent activities, also known as click fraud. Click Fraud is a problem in online advertising wherein advertisements are clicked by non-customers seeking to gain publisher revenues.

A conventional approach to minimize click fraud is to examine Internet Protocol ("IP") source address to determine whether the clicks are generated from the same IP address. The advertiser can decline to pay if multiple clicks are detected from a single IP source address. Some statistical techniques and IP address-to-Location-mapping techniques exist to mitigate the problem of click fraud. However, a drawback associated with the conventional approach is that it does not handle spoofing very well. Spoofing or spoofing attack is a cheating or fraud act that disguises itself as another IP addresses and/or falsifying information for hiding its true identity.

SUMMARY

A network configuration having various network elements and user equipments capable of authenticating origin or identity of an access request is disclosed. Upon receipt of web addresses for monitoring from the "Subscription partners", the web addresses such as online advertisements are stored in a memory. A method capable of authenticating identity of an access request monitors network traffic in accordance with the web addresses stored in the memory. Upon detecting or matching an access request, the method creates an authentication record which authenticates the origin or identity of the user equipment that made the access request. The authentication record is subsequently forwarded to a subscription partner via a predefined messaging mechanism.

Additional features and benefits of the exemplary embodiment(s) of the present invention will become apparent from the detailed description, figures and claims set forth below.

BRIEF DESCRIPTION OF THE DRAWINGS

The exemplary embodiment(s) of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Figure 1:
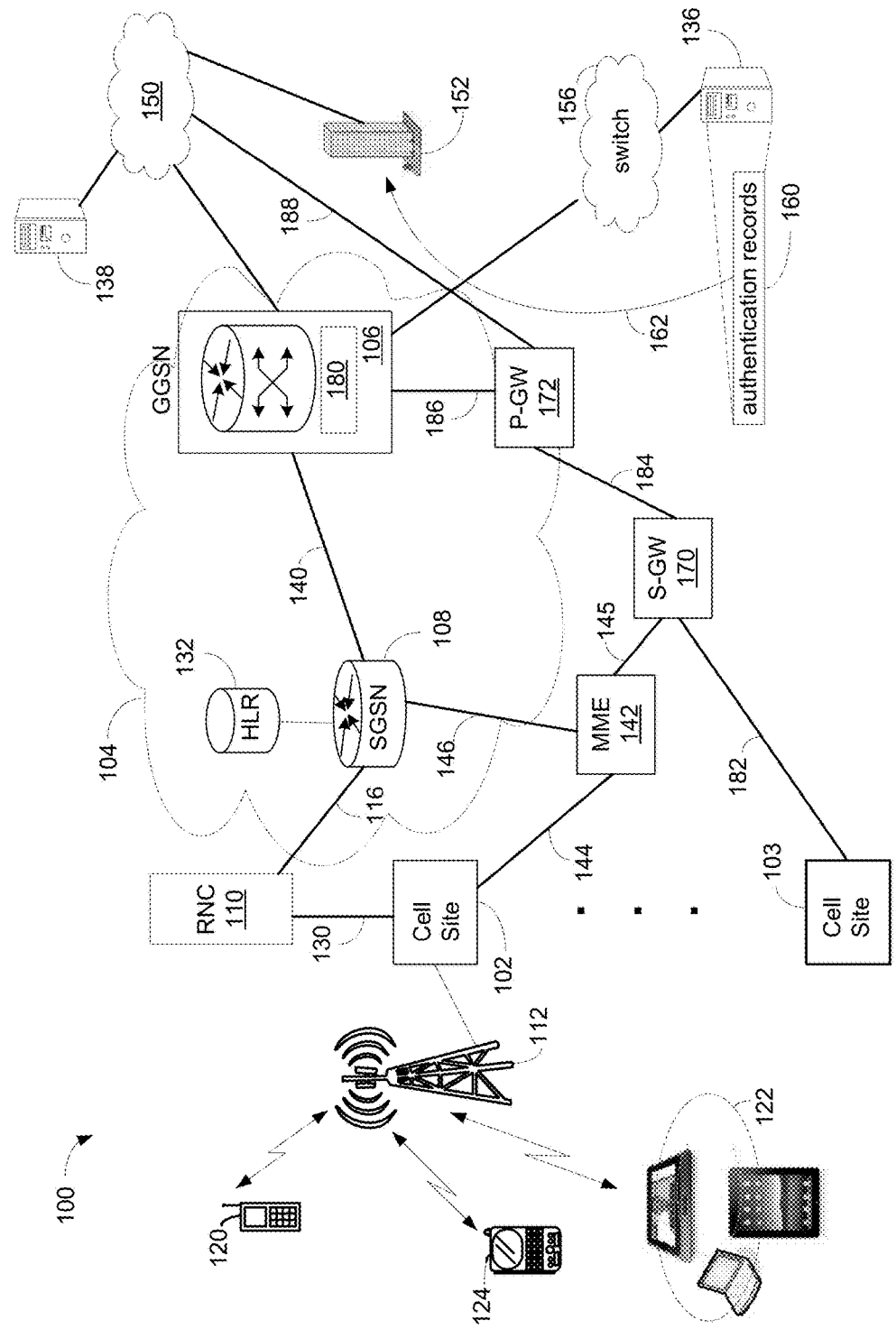
FIG. 1 is a block diagram illustrating a network configuration having one or more network devices configured to provide authentication records to verify origin of access request in accordance with one embodiment of the present invention.

Exemplary embodiment(s) of the present invention is described herein in the context of a method, device, and apparatus of authenticating an origin or identity of a user equipment that issues an access request.

Those of ordinary skills in the art will realize that the following detailed description of the exemplary embodiment(s) is illustrative only and is not intended to be in any way limiting. Other embodiments will readily suggest themselves to such skilled persons having the benefit of this disclosure. Reference will now be made in detail to implementations of the exemplary embodiment(s) as illustrated in the accompanying drawings. The same reference indicators will be used throughout the drawings and the following detailed description to refer to the same or like parts.

In the interest of clarity, not all of the routine features of the implementations described herein are shown and described. It will, of course, be understood that in the development of any such actual implementation, numerous implementation-specific decisions may be made in order to achieve the developer's specific goals, such as compliance with application- and business-related constraints, and that these specific goals will vary from one implementation to another and from one developer to another. Moreover, it will be understood that such a development effort might be complex and time-consuming, but would nevertheless be a routine undertaking of engineering for those of ordinary skills in the art having the benefit of embodiment(s) of this disclosure.

Various embodiments of the present invention illustrated in the drawings may not be drawn to scale. Rather, the dimensions of the various features may be expanded or reduced for clarity. In addition, some of the drawings may be simplified for clarity. Thus, the drawings may not depict all of the components of a given apparatus (e.g., device) or method.

Unless otherwise defined, all terms (including technical and scientific terms) used herein have the same meaning as commonly understood by one of ordinary skills in the art to which the exemplary embodiment(s) belongs. It will be further understood that terms, such as those defined in commonly used dictionaries, should be interpreted as having a meaning that is consistent with their meaning in the context of the relevant art and this exemplary embodiment(s) of the disclosure.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The term "and/or" includes any and all combinations of one or more of the associated listed items.

The term "system" is used generically herein to describe any number of components, elements, sub-systems, devices, packet switch elements, packet switches, access switches, routers, networks, computer and/or communication devices or mechanisms, or combinations of components thereof. The term "computer" includes a processor, memory, and buses capable of executing instruction wherein the computer refers to one or a cluster of computers, personal computers, workstations, mainframes, or combinations of computers thereof.

IP communication network, IP network, or communication network means any type of network having an access network able to transmit data in the form of packets or cells, for example of ATM (Asynchronous Transfer Mode) type, on a transport medium, for example, the TCP/IP or UDP/IP type. ATM cells are the result of decomposition (or segmentation) of packets of data, IP type, and those packets (here IP packets) comprise an IP header, a header specific to the transport medium (for example UDP or TCP) and payload data. The IP network may also include a satellite network, a DVB-RCS (Digital Video Broadcasting-Return Channel System) network, providing Internet access via satellite, or an SDMB (Satellite Digital Multimedia Broadcast) network, a terrestrial network, a cable (xDSL) network or a mobile or cellular network (GPRS/EDGE, or UMTS (where applicable of the MBMS (Multimedia Broadcast/Multicast Services) type, or the evolution of the UMTS known as LTE (Long Term Evolution), or DVB-H (Digital Video Broadcasting-Handhelds)), or a hybrid (satellite and terrestrial) network.

Information pertaining to the transfer of packet(s) through a network is embedded within the packet itself. Each packet traveling through one or more communications networks such as Internet and/or Ethernet can be handled independently from other packets in a packet stream or traffic. For example, each router, which may include routing, switching, and/or bridging engines, processes incoming packets and determines where the packet(s) should be forwarded.

An embodiment(s) of the present invention discloses a method and/or a network apparatus capable of authenticating the origin or identity of a user's equipment ("UE") that issued an access request. An access request refers to a request for online accessing to a particular website or demanding one or more web pages. For example, an access request is a request to access an online advertisement ("Ad"). The request can be initiated by clicking an Ad displayed on a mobile device. A data center or central office coupled to a packet core gateway, in one embodiment, is assigned the task of authenticating the origin or identity of the UE upon detecting an access request or a click of an advertisement. After detecting a click, an authentication record which authenticates the origin or UE that issues the request is created. The authentication record is subsequently forwarded to the subscription partner via a predefined messaging mechanism.

FIG. 1 is a block diagram 100 illustrating a network configuration having one or more network devices configured to provide authentication records to verify origin of access request in accordance with one embodiment of the present invention. Diagram 100 illustrates cell sites 102-103, switching network 104, network nodes 106-108, mobility management entity ("MME") 142, radio network controller ("RNC") 110, serving gateway ("S-GW") 170, and packet data network gateway ("P-GW") 172. Node 106 is further coupled to Internet, wide area network ("WAN"), or virtual private network ("VPN") 150. Internet, WAN, or VPN, hereinafter referred to as Internet, provides network communication between node 106 and network devices such as server 138 and content provider or subscription partner 152. Content provider 152, in one aspect, is an advertising exchange agency, subscription partner, or a publisher facilitating online advertising in connection with various applications. Server 138 may be an advertiser, publisher, remote network policy maker, and the like. It should be noted that the underlying concept of the exemplary embodiment(s) of the present invention would not change if one or more blocks (or devices) were added to or removed from diagram 100.

The network configuration illustrated in diagram 100 may also be referred to as a third generation ("3G") or 4G or combination of 3G and 4G cellular network configuration. MME 142, in one aspect, is coupled to cell site 102 and S-GW 170 via connections 144-145 and is capable of facilitating data transfer between 3G and LTE (long term evolution) or between 2G and LTE (or 4G). In the LTE (or 4G) network environment, MME 142 performs various controlling/managing functions, such as UE (user equipment) idle mode for tracking, paging, and retransmitting. MME 142 also provides network security management as well as resource allocations. To access packet based and/or IP based networks, MME 142, in one aspect, depends on S-GW 170 via connection 145 to reach other networks such as Ethernet and/or Internet 150.

S-GW 170, in one example, is coupled to MME 142 and cell site 103 via connections 145 and 182, and is capable of routing data packets from cell site 103 (eNodeB) or MME 142 to P-GW 172 via connection 184. Note that S-GW 170 can couple to additional network elements such as other MMEs and/or base stations. In an evolved packet core ("EPC") network environment, S-GW 170 is used to perform an anchoring function for mobility between 3G and 4G equipments. S-GW 170, in one aspect, performs various network management functions, such as terminating paths, paging idle UEs, storing data, routing information, generating replica, and the like.

P-GW 172, in one embodiment, is coupled to S-GW 170, GGSN 106, and Internet 150 via connections 184-188, wherein P-GW 172 is able to provide network communication between an UE and IP based networks such as Internet 150. P-GW 172 is used for connectivity, packet filtering, inspection, data usage, billing, or PCRF (policy and charging rules function) enforcement, et cetera. P-GW 172 also provides an anchoring function for mobility between 3G and 4G (or LTE) packet core network(s). Note that P-GW 172 could be merged into GGSN 106 as a single NE or node. Alternatively, P-GW 172 is able to directly route data between UEs via Internet 150.

Switching network 104 may be referred to as packet core network and cell sites 102-103 may be referred to as radio access networks. It should be noted that a different network architecture or configuration may be implemented for 3G, 4G, or 5G cellular networks with different layout of network elements, and/or differently-named network elements, but the underlying concept of exemplary embodiment would not change. Switching network 104, also known as a core network or packet core network transfers or routes information or network traffic between clients and network servers. Switching network 104 can be an IP and/or Multi Protocol Label Switching ("MPLS") based switching network which may operate at a layer of Open Systems Interconnection Basic Reference Model ("OSI model"). Switching network 104 includes network nodes 106-108, a home location register ("HLR") 132 and routes packet traffic between cell sites 102-103 and Internet 150 via nodes 106-108. Node 108 transmits information between cell site 102 and HLR 132 via connections 116 and 130. Note 106 transmits information to (and receives information from) cell site 102 via connections 140, 116, and 130.

Node 106, in one embodiment, is a gateway GPRS support node ("GGSN") where in GPRS is general packet radio service. GGSN 106 includes one or more routers or switchers capable of managing, monitoring, and routing network traffic or network flows between sources and destinations. Network flow or packet flow, in one example, is a network access initiated by a subscriber and/or a user. Network node or GGSN 106, hereinafter referred to as GGSN, can also be a router, Access Service Network Gateway, Packet Data Network Gateway ("P-GW" or "PDN-GW"), Serving Gateway ("S-GW"), switch, hub, or a combination of router, Access Service Network Gateway, P-GW, S-GW, switch, and/or hub.

Node 108, in one embodiment, is a serving GPRS support node ("SGSN") configured to authenticate portable wireless UEs, registering mobile devices, collecting network usage information for billing, et cetera. While SGSN 108 tracks and/or controls mobile communication, GGSN 106 inspects and routes information and/or packet traffic between mobile terminal(s) and intended destination(s). Alternatively, SGSN 108 is connected to MME 142 which is also able to route packet streams to/from a long term evolution ("LTE") network. MME 142, for example, can track and/or page active and/or idle user equipments ("UEs") or subscribers' mobile terminals in an LTE network. Note that SGSN 108 can include MME functions. It should be noted that node 108 can be SGSN, MME, and/or a combination of SGSN and MME.

RNC 110, for example, may couple to other network elements such as a second RNC or PCU (packet control unit), not shown in FIG. 1, to enhance network management and communication. Connections 116 and 140 are used to facilitate communication between RNC 110 and nodes 106-108. RNC 110, in one example, provides network management for controlling network elements ("NEs") in UMTS (universal mobile telecommunications system) radio access network ("UTRAN") and base stations that are connected to it.

Cell site 102, also known as base station, node B, or eNodeB, includes a radio tower 112. Radio tower 112 is further coupled to various UEs, such as a cellular phone 120, a handheld device 124, tablets and/or iPad® 122 via wireless communications. Handheld device 124 can be a smart phone, such as iPhone®, BlackBerry®, Android®, and so on. Cell site 102 facilitates network communication between mobile devices such as handheld device 124 and iPad® 122 via radio tower 112. It should be noted that cell site 102 may include additional radio towers as well as other land switching circuitry.

Mobile networks are classified into two parts, namely a radio access part such as cell site 102 and core network part such as network 104. The packet core network, which may include a gateway node (SGSN, GGSN), allocates the IP address to the mobile device enabling the allocated mobile device for communicating with the global IP. In one example, GGSN acts as a router and the IP address is allocated by a DNS server. GGSN provides a tunnel to the mobile user. In one aspect, the core network or packet core gateway includes accounting and authorization components, such as billing, charging, subscribing, tracking, authorizing, performance, usage, and the like.

The radio access network includes a radio base station such as cell site 102 and a controller. The controller can be located physically within a base station node or a gateway node. In one example, the radio network controller and the base station constitute the radio access network. The core network or a gateway node connects to a radio access network for communicating with the IP network. The gateway node is a gateway for IP access of wireless networks.

Referring back to FIG. 1, diagram 100 further includes a data center or central office which could reside at a network server 136, GGSN 106, or other network device(s) within packet core gateway 104. The data center or central office, in one embodiment, includes an UE authentication ("UEA") system capable of providing an authentication record in response to an access request of a web page. For example when a user clicks an online advertisement on an application in his or her UE, the UEA system is able to generate and send the authentication record or report containing the identity of user's UE to a subscriber.

The UEA system, in one embodiment, includes multiple modules and/or components such as a monitoring module and authentication database ("ADB"). Depending on the applications, the UEA system may be a component of hardware, firmware, software, or a combination of hardware, firmware, and software. The modules and/or components of UEA system may be placed in a single server or in multiple network elements such as GGSN 106 and server 136.

GGSN 106, in one embodiment, includes an authentication module 180 which may be part of UEA system capable of monitoring network traffic that flows through the network in accordance with a predefined set of web accessing addresses indexed by Universal Resource Locator ("URL"). A table or storage location containing the predefined set of web accessing addresses may be included in authentication module 180. Upon detecting a web access request or a click of an advertisement, the UEA system creates an authentication record authenticating the origin of the click. The UEA system, in one embodiment, includes a database 160 used for temporary storing authentication record(s) before it is being sent to the subscriber(s). GGSN 106, in one aspect, is coupled to a data center or central office 136 via a switching network 156. Depending on the applications, server 136 which hosts at least a portion of the UEA system can be directly connected to GGSN 106 or indirectly connected to GGSN 106 via switching network 156.

A function of GGSN 106, in one embodiment, is to inspect packet flow in the network in response to web addresses stored in the memory to identify whether a subscribed advertisement click is detected. Note that GGSN 106 keeps track of routing paths for each UEs including radio tower addresses and base station numbers. Upon identifying a subscribed advertisement click, the UEA system collects relevant information relating to the UE that initiates the click via various network elements in packet core gateway 104 such as GGSN 106 and SGSN 108. The relevant information relating to the UE includes international mobile subscriber identification ("IMSI"), N-tuple flow information(Source IP, Destination IP, L4 Protocol, Source Port, Destination Port, DSCP etc), Geo-location of the subscriber, and mobile models. An advantage of using the UEA system including authentication module 180 is that packet core gateway 104 contains accurate information to identify UE since it has the knowledge of NodeB/eNodeB, radio tower, geo-location, the UE type, and et cetera.

During an operation, after advertising exchange agency 152 ("AEA") subscribes the advertising click ("ad-click") service and transfers a list of predefined online advertisements to authentication module 180, GGSN 106 begins to monitor network traffic flowing through the network. Upon matching a flow's URL address with the address of a predefined online advertisement, the UEA system generates an authentication record identifying the origin or issuer of the flow's URL address. The authentication record, in one embodiment, includes information from various network elements including GGSN 106, SGSN 108, MME 142, and the like. When the authentication record is composed, the record is forwarded to AEA 152 via a logical connection 162. Note that the authentication record may be sent to AEA 152 via switching network 156, packet core gateway 104, and Internet 150. Upon receipt of the authentication record, AEA 152 can accurately identify of UE that accesses the advertisement and approximate location of the UE when the advertisement was clicked.

An advantage of employing the UEA system is to reduce click fraud in mobile advertising with mobile operator analysis. For instance, the UEA system uses various parameters, such as source IP address, Geo-location, Ad campaign, Publisher, Device Type, User-Agent, et cetera, that cannot be easily spoofed because the parameters are authenticated by the mobile operator from the data center or central office.

Figure 2:
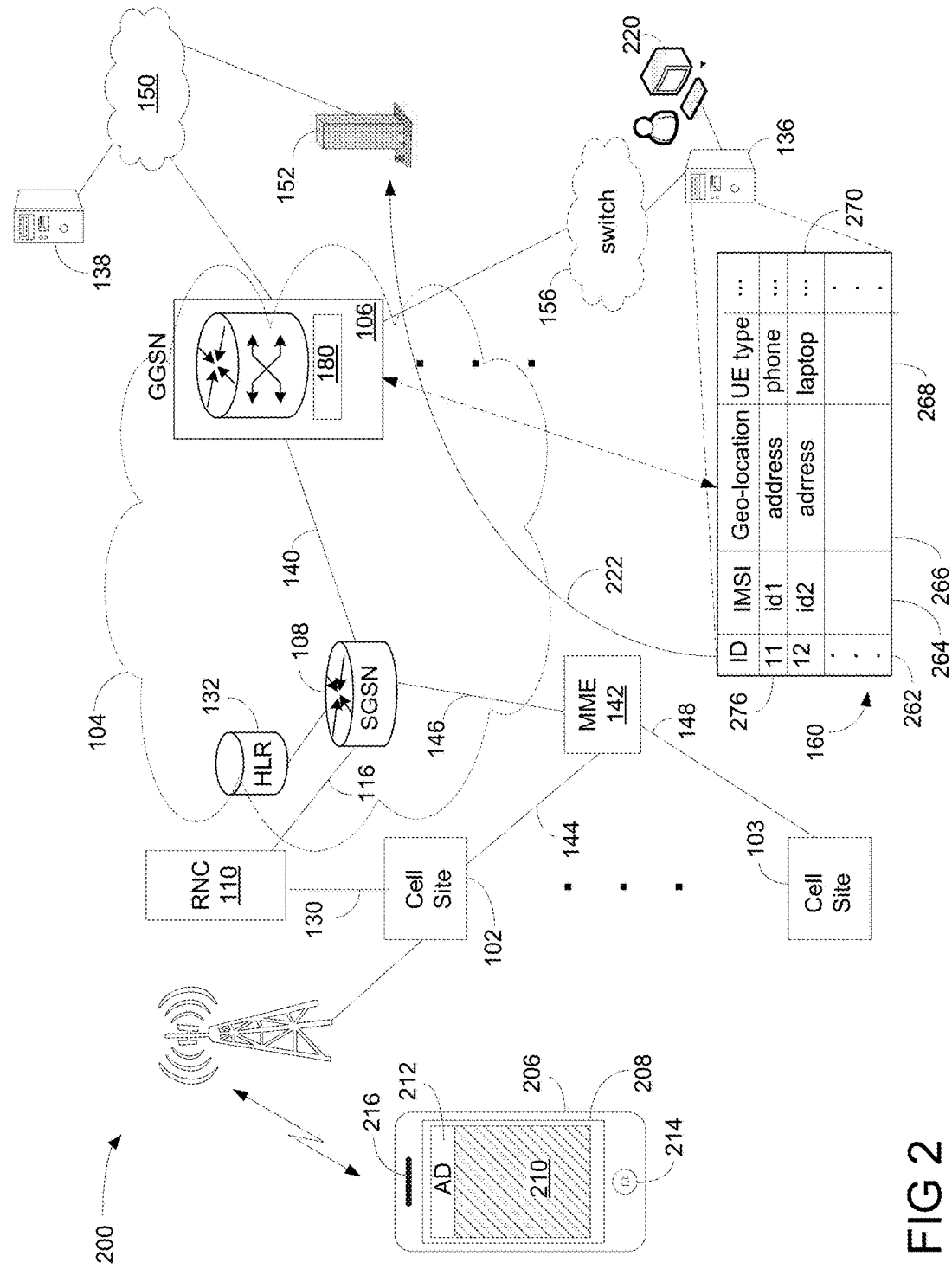
FIG. 2 is a block diagram illustrating a simplified network configuration having an UEA system capable of providing Ad click authentication services in accordance with one embodiment of the present invention.

FIG. 2 is a block diagram 200 illustrating a simplified network configuration having an UEA system capable of providing Ad click authentication services in accordance with one embodiment of the present invention. Diagram 200 is a simplified version of diagram 100 as shown in FIG. 1. Diagram 200 includes a mobile device 206, cell sites 102-103, switching network 104, Internet 150, advertising exchange server 152, a data center 220 with mobile operator, and a database 160. In one embodiment, the UEA system and database 160 reside at data center 220 and server 136. It should be noted that the underlying concept of the exemplary embodiment(s) of the present invention would not change if one or more blocks (or devices) were added to or removed from diagram 200.

Mobile device 206, in one embodiment, includes a screen 208, a button 214, and a speaker 216 wherein screen 208 displays a mobile application 210 and an advertisement or Ad 212. For example, mobile device 206 can be a portable wireless UE, such as a smart phone, a laptop, a tablet, and the like, and is connected to a cellular radio network for accessing web advertisements via one or more web applications. Cell site 102 having a radio tower is used to facilitate communication between mobile device 206 and packet core gateway 104 which is able to verify authenticity of mobile device 206. In one embodiment, packet core gateway 104 includes network elements 106-108, data center 220, and database 106, wherein database 106 stores authentication records 270. Authentication records 270 provide reliable identities about the connected or known UEs and/or network devices.

Advertising exchange server 152, in one embodiment, is a publisher capable of providing additional web pages or redirects the advertising access request(s) to the advertiser home page. The publisher or advertising exchange agency facilitates buying and selling online advertisements for at least one advertisement network. Note that the publisher or advertising exchange agency can, for example, reside at server 152.

Data center 220 which could be a part of central office is coupled to packet core gateway, UEA system, GGSN, and/or server 136, wherein the UEA system includes one or more modules capable of providing an authentication record of mobile device 206 to advertising exchange server 152 when Ad 212 had been clicked. In one aspect, the mobile operator at data center 220 verifies authenticated information from the radio tower and mobile device 206. Data center 220 sends a Hypertext Transfer Protocol ("HTTP") request with the authentication record to advertising exchange server 152 once the record is created in response to the detection of an Ad click.

To provide an authenticity of an UE such as UE 206 upon detection of Ad click, the UEA system collects authentication information from various network elements since network elements such as SGSN 108 and GGSN 106 contain information relating to UE 206 including which radio tower is coupled to UE 206. In one embodiment, packet core gateway 104 opens a secure analytic channel 222 with each Ad (Advertising) network partner. When a mobile sends a HTTP/HTTPs (hypertext transfer protocol) address to an Ad partner through APIs (application programming interfaces) in mobile as well as web applications, packet core gateway sends an authentication record to the Ad partner via channel 222. The authentication record, in one example, includes various parameters including (1) one way dynamically generated hash of IMSI; (2) N-Tuple information (flow identifier); (3) geo-location of the subscriber; and (4) mobile model and type. Upon receipt of the authentication record, Ad network or partner obtains reliable location information about one or more UEs.

Database 160 includes a table containing one or more authentication records. For example, the table includes an ID column 262, an IMSI column 264, a Geo-location column 266, and an UE type column 268. Each authentication record includes an ID, Geo-location, and UE type. For example, the table includes authentication record 270 having an ID of 11, and authentication record 276 having an ID of 12. Database 160, which is a part of UEA system, may reside at server 136, GGSN 106, or any other network element in packet core gateway 104.

Figure 3:
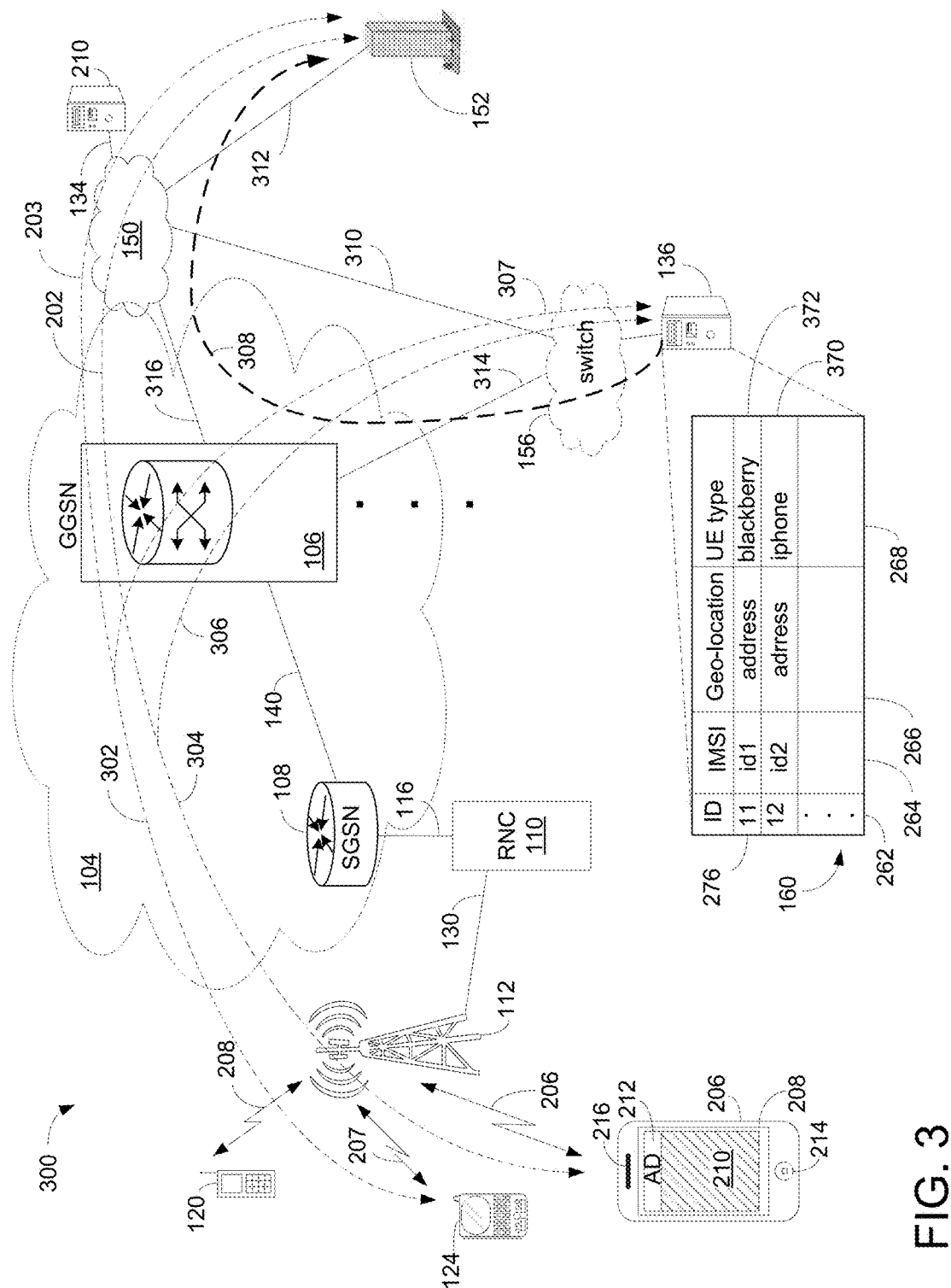
FIG. 3 is an exemplary computer network layout illustrating a computer network capable of providing Ad click authentication services to subscription partners in accordance with one embodiment of the present invention.

FIG. 3 is a diagram 300 illustrating a computer network capable of providing Ad click authentication services to subscription partners in accordance with one embodiment of the present invention. Diagram 300 is simplified versions of diagram 100 as shown in FIG. 1. Diagram 300 includes radio tower 112, GGSN 106, SGSN 108, and Internet 150 wherein Internet 150 connects to various network devices such as server 210 and publisher (or AEA) 152. Radio tower 112 is further connected to various UEs, such as cellular phone 120, iPhone® 206, and handheld device 124 via wired or wireless communications 206-208. Diagram 300 further includes a server 136 which, in one aspect, hosts the UEA system. Server 136 is coupled to publisher 152 via connections 310-312 or connections 314-316 and 312. It should be noted that the underlying concept of the exemplary embodiment(s) of the present invention would not change if one or more blocks (or devices) were added to or removed from diagram 300.

When a user of handheld device 124 clicks an Ad displayed on handheld device 124, the click initiates and sends an Ad access request having an HTTP address to publisher 152 via path 302. After detecting the Ad access request over path 302, the UEA system copies and sends the copied Ad access request to server 136 via path 307. Upon receiving the copied Ad access request, an authentication record is created for identifying handheld device 124. Once the authentication record is completed, the UEA system sends the authentication record such as record 372 to publisher 152 via a conventional request and/or acknowledge messaging system through channel 308.

In another example, when a user of iPhone® 206 clicks an Ad 212 displayed on iPhone® 206, the click initiates and sends an Ad access request having an HTTP address to publisher 152 via path 304. After detecting the Ad access request over the path 304, the UEA system copies and sends the copied Ad access request to server 136 via path 306. Upon receiving the copied Ad access request, an authentication record is created or built for identifying iPhone® 206. The UEA system sends the authentication record such as record 370 to publisher 152 via channel 308 using an HTTP request message.

Figure 4:
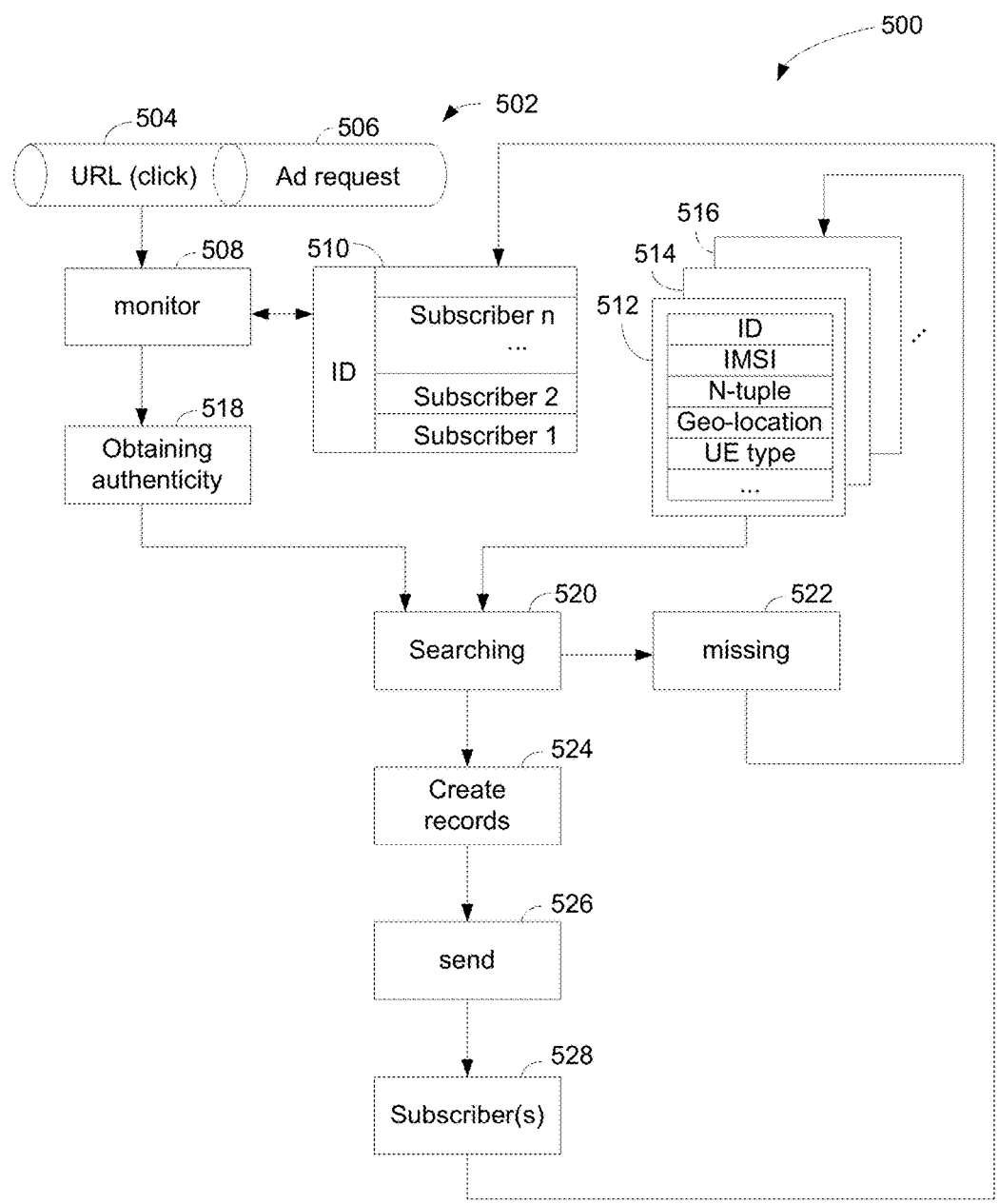
FIG. 4 is a logic flow diagram illustrating an authentication process for verifying origin of Ad click in accordance with one embodiment of the present invention.

FIG. 4 is a logic flow diagram 500 illustrating an authentication process for verifying origin of Ad click in accordance with one embodiment of the present invention. Upon receipt of network traffic or a packet stream 502, monitor 508 extracts information such as URL address 504 and Ad request 506 from packet stream 502, and compares the URL address 504 with predefined subscribed addresses in a local memory 510. If a match is found, obtaining authenticity block 518 forwards URL address 504 and/or Ad request 506 to searching block 520 indicating authenticity is required.

Searching block 520 searches verification information in tables 512-516 to determine whether any of tables 512-516 contains reliable authentication information about an initiating UE that issues the click of Ad. If tables 512-516 do not contain any information about the initiating UE, a miss occurs. Missing block 522 begins a collecting process that searches through one or more network devices such as SGSN or GGSN to obtain relevant information regarding the initiating UE. Creating records block 524 begins to build an authentication record when the authentication information of initiating UE becomes available. The authentication record is subsequently forwarded to subscription partner 528 via an HTTP message by sending block 526. Note that information relating to UE may include, but not limited to, ID, IMSI, N-tuple, Geo-location, UE type, ct cetera.

The exemplary aspect of the present invention includes various processing steps, which will be described below. The steps of the aspect may be embodied in machine or computer executable instructions. The instructions can be used to cause a general purpose or special purpose system, which is programmed with the instructions, to perform the steps of the exemplary aspect of the present invention. Alternatively, the steps of the exemplary aspect of the present invention may be performed by specific hardware components that contain hard-wired logic for performing the steps, or by any combination of programmed computer components and custom hardware components.

Figure 5:
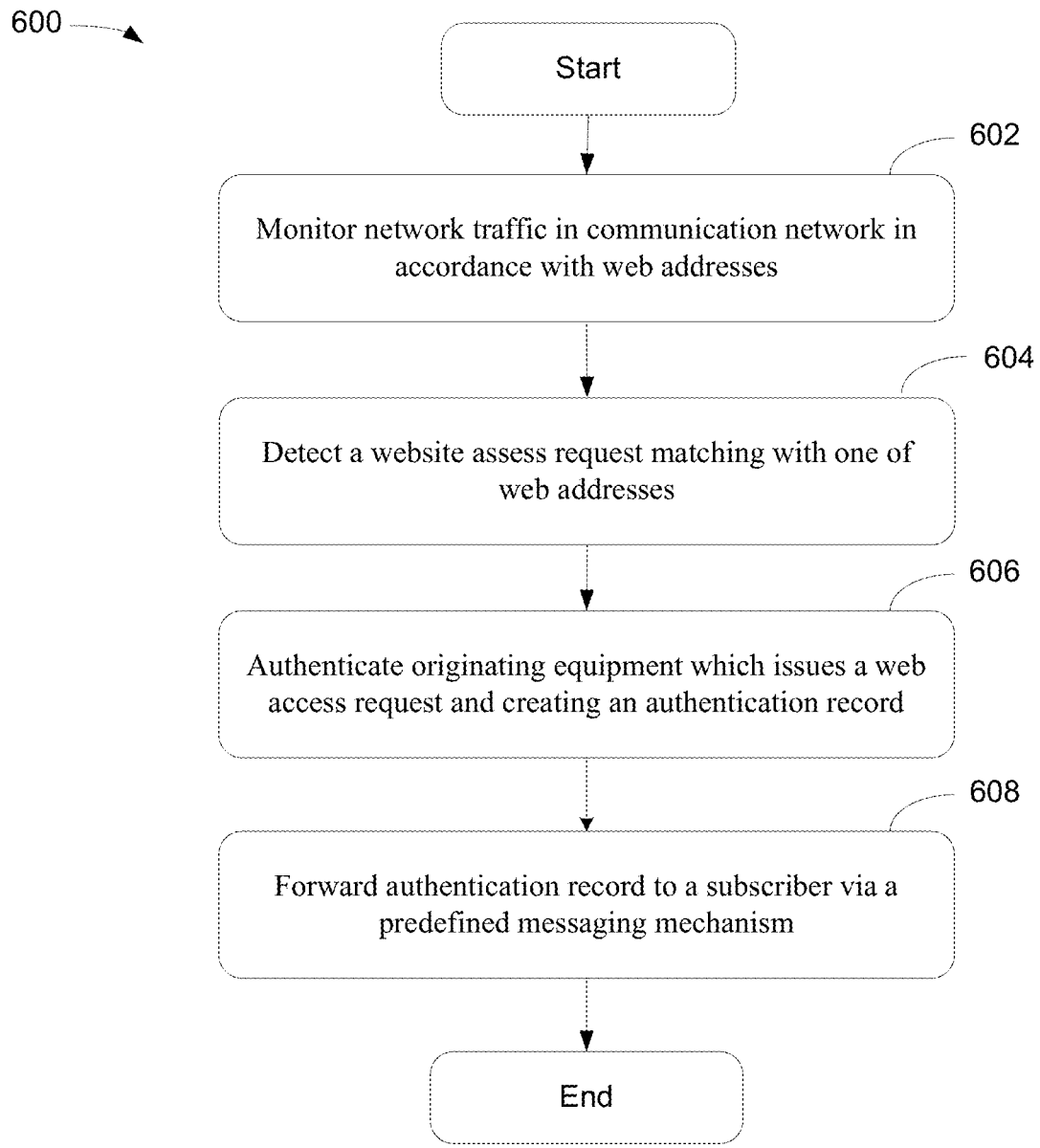
FIG. 5 is a flowchart illustrating an exemplary process of providing an authentication of Ad click in accordance with one embodiment of the present invention.

FIG. 5 is a flowchart 600 illustrating an exemplary process of providing an authentication of Ad click in accordance with one embodiment of the present invention. At block 602, a process for authenticating an Ad access request begins to monitor network traffic in the communication network in accordance with web addresses stored in a memory. The stored web addresses are received from one or more web advertising exchange agencies who have subscribed the click authentication service. In one embodiment, the process is able to determine URL addresses associated with the Ad clicks and compares the determined URL addresses with stored web addresses. In one aspect, the UEA system tracks network traffic associated with signals traveling through wireless and/or LAN networks.

At block 604, upon detecting a match between a determined URL address and a stored web address, an Ad click is identified. An Ad click means that an online Ad has been clicked. Note that web Ad or online Ad is displayable on a screen and is clickable on a mobile application.

At block 606, UE or UE issuing the web access request is authenticated and an authentication record containing verifying information associated with the UE is subsequently created. UE issuing the web access request, in one embodiment, is referred to as an UE displaying an Ad which had been clicked. In one embodiment, the process is capable of obtaining an IMSI associated with UE, and N-Tuple information of flow relating to UE. In addition, a Geo-Location associated with the UE and mobile model or type of UE.

At block 608, the process forwards the authentication record to a subscription partner via a predefined messaging mechanism such as an HTTP request. For example, the process sends a HTTP request which includes the authentication record to an advertising exchange agency or publisher. As a result, Ad publisher or AEA obtains reliable location information of UEs indicating their displayed Ads been clicked.

An advantage of using the UEA system is to enhance reliable authenticity of UEs to minimizing malicious click fraud attacks.

While particular embodiments of the present invention have been shown and described, it will be obvious to those of skills in the art that based upon the teachings herein, changes and modifications may be made without departing from this exemplary embodiment(s) of the present invention and its broader aspects. Therefore, the appended claims are intended to encompass within their scope all such changes and modifications as are within the true spirit and scope of this exemplary embodiment(s) of the present invention.

What is claimed is:

1. A communication network configured to generate a report identifying a user equipment ("UE"), comprising:
   a mobile device coupled to a communication network and configured to access and display online advertisements;
   an advertising exchange server ("AES") coupled to the communication network and configured to provide additional web pages relating to the online advertisements to the mobile device upon receipt of access requests associated with the online advertisement initiated by the mobile device;

a router configured to perform a gateway GPRS support node ("GGSN"), coupled to the mobile device and the AES for routing information between the mobile device and the AES, the router configured to obtain an International Mobile Subscriber Identification ("IMSI") of the mobile device from web access request generated by the mobile device and a geo-location associated with the mobile device from a cell site coupled to the communication network, the router configured to create an authentication record containing the IMSI and the geo-location associated with the mobile device when an advertising access request for the online advertisements initiated by the mobile device is detected; and a subscription partner coupled to the router and able to identify whether an ad-click is fraudulent based on IMSI information and geo-location of the mobile device in the authentication record.

2. The configuration of claim 1, further comprising a radio tower coupled to the communication network connected to the mobile device and capable of facilitating communication between the mobile device and the communication network upon authenticating the mobile device by the authenticating module.

3. The configuration of claim 2, further comprising a packet core gateway coupled to the communication network capable of facilitating communication between the radio tower and the communication network upon authentication of the radio tower by the authenticating module.

4. The configuration of claim 3, wherein the mobile device is one of a smart phone, a laptop, and a tablet configured to connect to a cellular radio network for accessing the web pages relating to the one or more advertisements via one or more web applications.

5. The configuration of claim 3, wherein the advertising exchange server is coupled to the packet core gateway and able to facilitate buying and selling online advertisements for at least one advertisement network.

6. The configuration of claim 3, wherein the data center is able to identify the radio tower that is associated with the mobile device.

7. The configuration of claim 3, wherein the packet core gateway stores a plurality of authentication records which provide identities of connected network devices.

8. The configuration of claim 6, further comprising a data center configured to send a Hypertext Transfer Protocol ("HTTP") request with the authentication record to the advertising exchange server upon detecting a Universal Resource Locator ("URL") address indicating a click on the advertisement by a user of the mobile device.

9. A communication network configured to generate a report identifying a user equipment ("UE"), comprising:

a mobile device coupled to a communication network and configured to display an application with an advertisement;

an advertising exchange server ("AES") coupled to the communication network and configured to provide additional web pages relating to one or more advertisements upon receipt of one or more advertising access requests;

a router, coupled to the mobile device and the advertising exchange server, configured to route network traffic between the mobile device and the AES via the communication network, wherein the router is able to monitor and detect an advertising request sent from the mobile device to the AES, the router configured to capture an International Mobile Subscriber Identification ("IMSI") of the mobile device from a web access request generated by the mobile device and a geo-location associated with the mobile device from a cell site coupled to the communication network, the router configured to create an authentication record storing the IMSI, geo-location, N-tuple flow information associated with the mobile device from the network traffic carrying the advertising request; and a subscription partner coupled to the router and able to identify whether an ad-click is fraudulent based on IMSI information and geo-location of the mobile device in the authentication record.

10. The configuration of claim 9, wherein the authentication record includes information relating to a plurality of IMSIs, source Internet Protocol ("IP") addresses, Geo-locations, and Device Types of a plurality of cellular devices.

11. The configuration of claim 9, wherein the router includes an authentication module configured to provide the authentication record identifying associated to the mobile device to the advertising exchange server when an advertising access request for the advertisement displayed on the mobile device is clicked.

12. The configuration of claim 9, further comprising a radio tower coupled to the communication network connected to the mobile device and capable of facilitating communication between a user and the communication network upon authenticating the mobile device.

13. The configuration of claim 12, further comprising a packet core gateway coupled to the communication network capable of facilitating communication between the radio tower and the communication network upon authentication of the radio tower.

14. The configuration of claim 13, wherein the mobile device is one of a portable smart phone, a laptop, and a tablet configured to connect to a cellular radio network for accessing web pages relating to advertisements via one or more web applications.

15. The configuration of claim 13, wherein the advertising exchange server is coupled to the packet core gateway and able to facilitate buying and selling online advertisements for at least one advertisement network.

16. The configuration of claim 13, wherein the router is coupled to a data center and is able to identify the radio tower that is associated with the mobile device.

17. The configuration of claim 13, wherein the packet core gateway includes a plurality of authentication records which provide identities of connected network devices.

18. The configuration of claim 16, wherein the data center sends a Hypertext Transfer Protocol ("HTTP") request with the authentication record to the advertising exchange server upon detecting a Universal Resource Locator ("URL") address indicating a click on the advertisement by a user of the portable smart phone.

19. The configuration of claim 9, wherein the authentication record includes information relating to source Internet Protocol ("IP") address, Geo-location, Advertising campaign, Publisher, Device Type, and User-Agent.

* * * * *